Nov. 30, 1971 P. F. SWENSON, JR 3,623,333
ABSORPTION COOLING SYSTEM
Filed Sept. 22, 1969
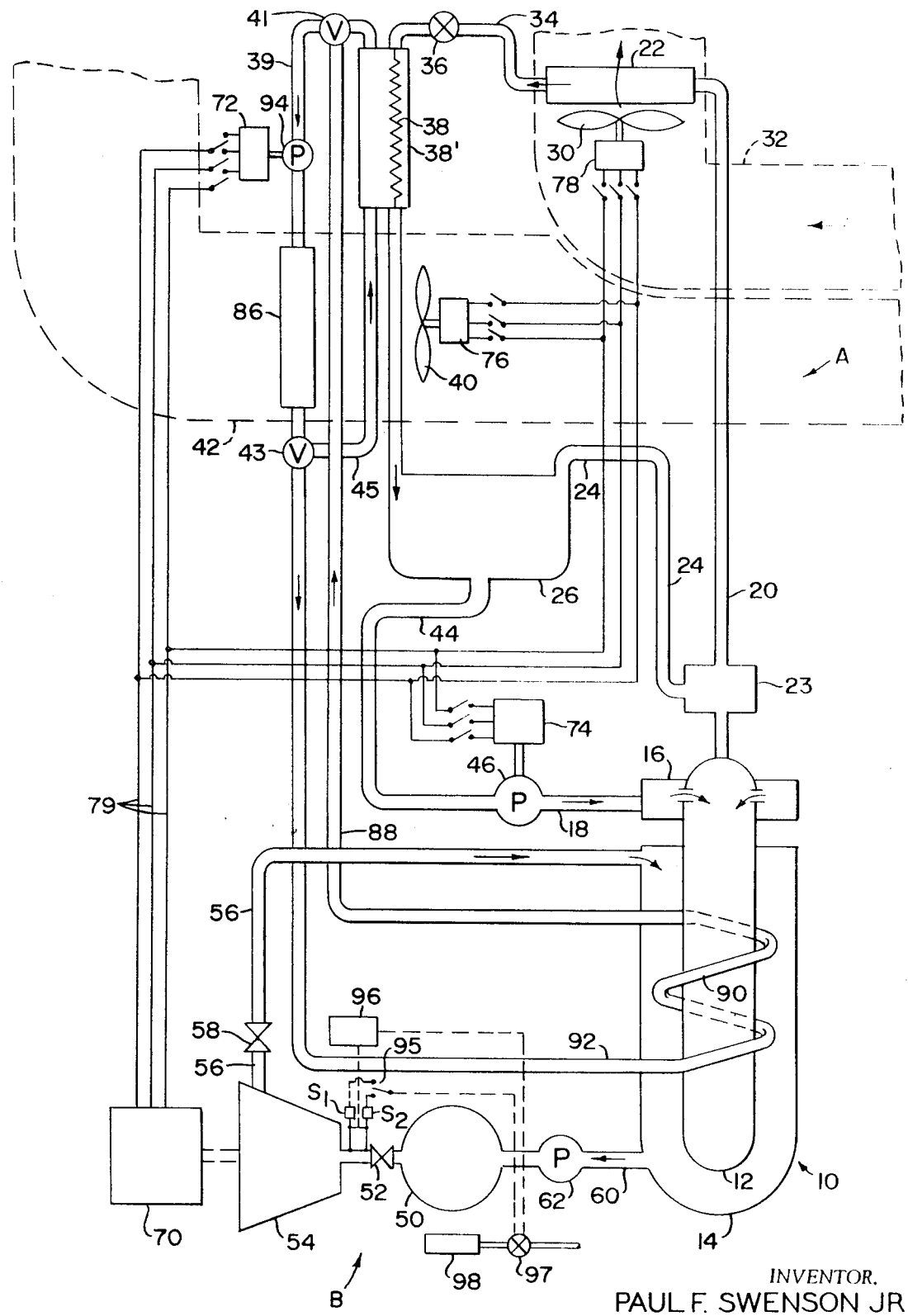
INVENTOR.
PAUL F. SWENSON JR.
BY
Meyer, Tilberry & Body
ATTORNEYS.

# United States Patent Office 3,623,333
Patented Nov. 30, 1971

3,623,333
ABSORPTION COOLING SYSTEM
Paul F. Swenson, Jr., Shaker Heights, Ohio, assignor to Swenson Research, Inc., Bedford Heights, Ohio
Filed Sept. 22, 1969, Ser. No. 859,880
Int. Cl. F25b 15/00
U.S. Cl. 62—104                    13 Claims

ABSTRACT OF THE DISCLOSURE

The disclosure is directed to an absorption refrigeration cycle of the type including a refrigerant vaporizer, a condenser and an evaporator. Associated with the refrigeration cycle is a power fluid vapor generator with a vapor turbine receiving power fluid vapor from the generator. Means are provided for conducting the exhaust power fluid vapor from the turbine to the refrigerant vaporizer for vaporizing the refrigerant passing therethrough. First pump means function for pumping refrigerant to the refrigerant vaporizer and a fan means serves to conduct cooling air across the refrigerant condenser. Also, there are means for drivingly connecting the turbine to the fan means and the first pump means.

---

The present invention is directed toward the heating and cooling art and, more particularly, to an absorption-type refrigeration system combined with a vapor turbine power cycle.

The invention is particularly suited for use as a combined heating and cooling system for residential and small commercial units and will be described with particular reference thereto; however, it will be appreciated the invention is capable of broader application and could, for example, be used for cooling alone and in a wide range of sizes.

Most of the current absorption-type cooling systems used in residential, domestic and small units have their refrigerant vaporizer directly heated by a gas burner. The house electrical supply is used to power the required fans, refrigerant pumps, etc.

Although some attempts have been made in the larger size units to use various waste heat sources for refrigerant vaporization. Normally, they have been relatively complex and lacking in efficiency with respect to overall energy utilization. Further, they also require an additional source of power (i.e., electricity); with the associated necessary electrical connections to power lines.

The present invention provides an absorption type system which is interrelated with a vapor turbine power cycle in a manner that assures overall system efficiency and simplicity. The system can be arranged to be completely self-contained without the need for an additional power source. Further, systems formed in accordance with the invention can be readily adapted for both heating and cooling with a minimum of addition or modification.

In accordance with one aspect of the invention, an absorption refrigeration cycle of the type including a refrigerant vaporizer and a condenser is provided with the improvement comprising: a power fluid vapor generator with a vapor turbine receiving power fluid vapor from the generator. Means are provided for conducting the exhaust power fluid vapor from the turbine to the refrigerant vaporizer for vaporizing the refrigerant passing therethrough. First pump means function for pumping refrigerant to the refrigerant vaporizer and a fan means serves to conduct cooling air across the refrigerant condenser. Also, there are means for drivingly connecting the turbine to the fan means and the first pump means. By proper design of the turbine, the exhaust vapor energy content is proper for the refrigerant vaporizer. The turbine exhaust will give up part of its energy as it desuperheats, the remainder as it condenses. Additionally, the power available from the turbine is relatively closely balanced with the auxiliary component requirements e.g., the system fans and pumps. This permits the total system to be extremely efficient.

In accordance with a more limited aspect of the invention, the means for drivingly connecting the turbine to the pump means comprises a high frequency alternator driven by the turbine, together with a high frequency electric motor for driving the pump means. Electrical conduit means serve to conduct the electrical output from the alternator to the electric motor.

Accordingly, a primary object of the invention is the provision of an interrelated absorption-type refrigeration cycle and vapor turbine power cycle.

An additional and more specific object is the provision of a system of the type described wherein the energy content in the exhaust vapor from the turbine is used for vaporizing the refrigerant, and the power output from the turbine is used to power the system auxiliaries.

Another object is the provision of a vapor-turbine power cycle related with an absorption refrigeration cycle in a manner which permits the system to be used for either heating or cooling.

A further object is the provision of a system of the type discussed which is simple and efficient, and which can operate without auxiliary power.

A still further object of the invention is the provision of a heating and cooling system wherein change-over between the heating and cooling modes can be made rapidly without modification of the major components or violating the hermiticity.

These and other objects and advantages will become apparent from the following description when read in conjunction with the accompanying drawing wherein the single figure shows, somewhat diagrammatically, a preferred embodiment of an absorption cycle refrigeration system associated with a vapor turbine power cycle.

As particularly shown in the drawing, the preferred embodiment of this system includes a generally conventional absorption-type refrigerant cycle A combined with, and driven by, a vapor-turbine power cycle B.

The absorption cycle A could take a variety of specific forms and configurations; however, according to the preferred embodiment the system includes a refrigerant vaporizer unit 10 which includes a closed inner chamber or heat exchanger 12 and an outer casing or housing 14 which surrounds the chamber 12 and is sealed relative thereto. A refrigerant fluid distribution header or chamber 16 surrounds the upper end of the chamber 12 and is supplied with an ammonia-water solution through a line 18. The ammonia-water solution is distributed through the interior of the chamber 12 by suitable conventional baffling (not shown) to facilitate vaporization of the ammonia and, in a manner to hereafter be described, is heated, causing the ammonia to be disassociated from the water with the ammonia gas passing outwardly through a line 20 to a refrigerant condenser coil 22. The remaining water portion of the solution is separated in the separator 23 and passes through a line 24 to a conventional absorber unit 26.

Associated with the condenser coil 22 and arranged to direct cooling air thereacross is a fan 30. The fan and condenser coil 22 are suitably mounted within an air duct 32 connected with a source of air exterior to the space being conditioned. Duct 32 will hereafter be referred to as the outside air duct. After passing through the condenser coil 22 the ammonia is passed through line 34 and expansion valve means 36 to an evaporator coil 38.

In the embodiment under consideration, the coil 38 is in heat exchange relationship with a secondary heat exchange fluid passing through the housing 38' surrounding coil 38. The secondary heat exchange fluid is withdrawn from the housing by a pump 94 connected with housing 38' by a line 39 and a valve 41. The output from pump 94 is supplied through a heat exchange coil 86. After passing through coil 86 the fluid is returned to housing 38 through a three-way valve 43 and a line 45.

Associated with the heat exchange coil 86 is a fan 40 arranged to direct the air from the space being conditioned continuously across the coil 38 during a cooling cycle. In the embodiment under consideration a duct 42 is shown surrounding the coil 86 and the fan 40. Hereafter, this duct will be referred to as the room air duct.

After passing through the evaporator coil 38 the ammonia is passed to the absorber unit 26 where it is mixed with the water portion returning through line 24. The ammonia-water solution is withdrawn from the absorber 26 through a line 44 by a refrigerant pump 46 connected with the line 18.

The cycle thus far described is relatively conventional and well known. Various of the described components can have many different auxiliary features and can take many configurations.

Of particular importance to the present invention is the interrelationship of the turbine power cycle B with the absorption cycle A. As previously mentioned, normally the refrigerant vaporizer 10 has been heated directly by a gas burner. Alternately, attempts have been made in large installations to use various waste heat sources and separately functioning steam boilers to supply the required heat for vaporizing the refrigerant. The present invention provides a power turbine system which is designed and related with the absorption cycle such that the heat energy necessary for refrigerant vaporization is supplied by the exhaust vapor coming from the associated turbine. The relationship is such that the useful power output of the turbine is adequate for driving the absorption cycle auxiliaries. It has been found that if the turbine is operated such that its exhaust vapor is at the energy required for proper refrigerant cycle vaporization, the effective power output of the turbine can closely match the power needs of the auxiliaries. For example, a Terry-type steam turbine can be operated such that the exhaust vapor temperature is in the range of 320°, the power output is adequate to properly drive the fans and solution pumps needed for the absorption system. The desirable range for vaporization being 320° F. to 380° F.

Referring more particularly to the vapor turbine cycle B, it will be seen that the cycle is of the closed loop type and includes a diagrammatically illustrated once-through boiler 50. The boiler 50 is a conventional once-through, gas fired type and has its vapor output connected through a shut-off or control valve 52 with the inlet of the Terry-turbine 54. The details and arrangement of the boiler and turbine can, for example, be as shown in the commonly assigned, U.S. Pat. 3,400,554, issued Sept. 10, 1968. The precise details of the boiler and turbine unit can take many different forms. Additionally, although in the subject embodiment the power fluid is water, other fluids could be used. The vapor exhausted from turbine 54 is passed through a line 56 to the chamber 14 of the refrigerant vaporizer 12. This exhaust steam thus supplies the energy required for the vaporization of the refrigerant ammonia-water solution. The vapor supplied from the turbine is condensed as it passes through the chamber 14 and thereafter, is returned through line 60 to the boiler 50 by a feed pump 62. The feed pump 62 can be driven as shown in the previously mentioned patent, or alternately, a separate directly steam driven pump.

In accordance with one aspect of the invention the power output of the turbine 54 is utilized for driving the various fans and pumps so that the entire unit is self contained. The driving connection between the turbine and the fans and pumps could be a mechanical drive; however, because of sealing problems and the like it is preferable to drivingly interconnect the turbine and the pumps through the use of an alternator 70 and high frequency AC motors 72, 74, 76 and 78. Obviously, one or more of the motors could be utilized for driving two or more of the pumps or fans. In the embodiment under consideration the alternator 70 is electrically connected through wires 79 with each of the motors 72, 74, 76 and 78. Suitable shut-off switches are provided in each set of lines running from the main line 79 to the individual motors.

As discussed in the commonly assigned, copending application Ser. No. 709,276, filed Feb. 29, 1968, and now issued as Pat. No. 3,487,655, this type of alternator-high frequency motor interconnection permits the fans and pumps to closely follow the output of the turbine. That is, as the load on the turbine changes because of reduced output requirements from the absorption cycle, the output speed of the turbine decreased bringing about a corresponding decrease in the speed of the alternator and, correspondingly, all of the pumps and the fans together. By properly selecting the pump sizes and the fan motor sizes relative to the turbine and refrigerant cycle, a close correlation can be made.

The described refrigeration system can readily be adapted to combined cooling and heating use. Note that heat exchange coil 86 is connected through line 88 and three way valve 41, with a heat exchange coil 90 which surrounds the inner chamber 12 of the refrigerant vaporizing unit 10. A line 92 extends from the coil 90 to the heat exchanger 86 through the valve 43. The pump 94 within line 39 thus functions to circulate the secondary heat exchange fluid continuously through the heat exchanger 86 and the coil 90 when valves 41, 43 are shifted. Accordingly, when it is desired to utilize the system for heating, the motor 78 and the pump 74 would be shut-off. The pump 94 would be started and the boiler would be permitted to continue operation. Thus, the energy in the exhaust steam passing to the chamber 14 from line 56 would heat the coil 90 and provide heated air for supply through duct 42 to the space being conditioned.

The system can be provided with many different types of control and undergo many different modifications or alterations. The important facet of the invention is the interrelationship between the turbine power cycle and the absorption power cycle whereby the actual power output of the turbine is closely matched to the auxiliary power needs of the absorption cycle. This together with the exhaust steam from the turbine being at the desired energy level for use in the refrigerant vaporizer makes the system extremely efficient in addition to being completely self-contained.

One particular control system which has been found to be desirable is shown somewhat diagrammatically in the figure. The control system shown is designed to use temperature control of the steam to the turbine to provide the desired ratio of power output to heat rejection.

The function of the control system can be understood by recognizing that the power requirements for heating are less than for cooling i.e., fan 78 and pump 46 are not required. And it is desirable to have the turbine operate at a lower speed on heating mode. This is because the dwelling air blower or fan 40 needs to move less air because the larger temperature difference present on the coil 86. Further, fan noise which would not be objectionable on the cooling mode, is objectionable in the heating mode. An additional factor affecting the control is that the turbine exhaust energy content must be higher on heating mode.

It is apparent that all three of the noted factors move in the same direction i.e., when going from cooling to heating the turbine must run slower, produce less power and reject more energy.

The subject invention allows all three of the above-factors to be achieved by control of the turbine inlet steam temperature set point. From basic thermodynamics it can be shown that with pressure unchanges, a reduction in temperature results in increased steam density and, thus, an increased mass flow rate through the turbine nozzles. Further, the enthalpy flux also increases but, the available energy drop as far as the turbine is concerned is reduced and the maximum turbine power is realized at reduced turbine blade speed assuming a fixed rejection temperature.

In the subject embodiment, the controls includes first and second temperature sensing switches $S_1$ and $S_2$ arranged to respond to the temperature of the steam supplied to the turbine. The switches are connected in parallel through a mode switch 95 which is shift control between the two switches depending upon whether the system is to operate on the heating or cooling mode. The switches $S_1$ and $S_2$ serve as the set point reference for the room thermostat and control unit 96 which controls the fuel valve 97 to maintain the supply of fuel to the boiler burner 98 at the proper level.

This invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. A cooling system comprising an absorption cycle including a refrigerant vaporizer and refrigerant condenser, the improvement comprising: a power fluid vapor generator; a vapor turbine receiving power fluid vapor from said generator; means for conducting the exhaust power fluid vapor from said turbine to said refrigerant vaporizer for vaporizing the refrigerant passing therethrough; first pump means for pumping refrigerant to said refrigerant vaporizer; a fan means for conducting cooling air across said refrigerant condenser; and, means for drivingly connecting said turbine to said fan means and said first pump means whereby the operating speeds of said fan means and said first pump means are controlled as a function of the speed of said turbine.

2. The improvement as defined in claim 1 wherein second pump means are provided for returning condensed power fluid from said refrigerant vaporizer to said vapor generator.

3. In a cooling system comprising an absorption cycle including a refrigerant vaporizer and a refrigerant condenser, the improvement comprising: a closed loop vapor power cycle including a vapor generator and a vapor turbine receiving vapor from said generator; means for conducting the exhaust power fluid from said turbine to said refrigerant vaporizer for vaporizing the refrigerant passing therethrough; pump means for pumping refrigerant to said refrigerant vaporizer; and, means for drivingly connecting said turbine to said pump means whereby the operating speed of said pump means is controlled as a function of the speed of said turbine.

4. The invention as defined in claim 3 wherein the means for drivingly connecting said turbine to said pump means comprises: an alternator driven by said turbine and a high frequency electric motor driving said pump means; and, electrical conduit means for conducting the electrical output from said alternator to said electric motor.

5. The improvement as defined in claim 3 including a closed, secondary heat exchange fluid circuit extending from said refrigerant vaporizer to a heat exchanger, and fan means for conducting air across said heat exchanger.

6. The invention as defined in claim 3 including a fan means for conducting air across said condenser and means connected between said turbine and said fan means for transmitting driving power from said turbine to said fan means.

7. The invention as defined in claim 3 wherein said absorption cycle includes an evaporator and a secondary heat exchange fluid circuit means extends between said evaporator and a heat exchange coil for conducting heat from said heat exchange coil to said evaporator.

8. The invention as defined in claim 7 wherein said secondary circuit means includes means for selectively transferring heat from said exhaust power fluid to said heat exchange coil.

9. The invention as defined in claim 7 including fan means for conducting air across said heat exchange coil.

10. The method of controlling the operation of a heating and cooling system of the type including a closed, vapor-turbine power cycle wherein the heat in the exhaust vapor from the turbine is used for selectively operating an absorption refrigeration cycle or for heating comprising the step of maintaining the temperature of the vapor supplied to said turbine at a first temperature when operating said absorption refrigeration cycle, and at a second lower temperature when using the exhaust turbine vapor for heating.

11. A cooling system comprising an absorption cycle including a refrigerant vaporizer and refrigerant condenser, the improvement comprising: a closed loop vapor power cycle including a vapor generator and a vapor turbine receiving vapor from said generator, which vapor is generated from a power fluid selected for optimum turbine operation; means for conducting the exhaust power fluid from said turbine to said refrigerant vaporizer for vaporizing the refrigerant passing therethrough; pump means for pumping refrigerant to said refrigerant vaporizer; and, means for drivingly connecting said turbine to said pump means whereby the operating speed of said pump means is controlled as a function of the speed of said turbine.

12. The cooling system as defined in claim 11 wherein said power fluid comprises water.

13. The cooling system as defined in claim 11 wherein said absorption cycle includes an evaporator and a secondary heat exchange fluid circuit means extends between said evaporator and a heat exchange coil for conducting heat from said heat exchange coil to said evaporator, said absorption cycle further including fan means for conducting air across said heat exchange coil, and wherein said vapor turbine supplies all the required power to operate said pump means and said fan means at generally near optimum speeds when said turbine is operated at near optimum speed.

References Cited

UNITED STATES PATENTS

| 560,081 | 5/1896 | Bretney | 60—95 X |
| 1,066,348 | 7/1913 | Voorhees | 60—95 |
| 2,724,579 | 11/1955 | Christiansson | 165—59 |
| 3,301,000 | 1/1967 | Holbay | 62—501 X |
| 3,363,674 | 1/1968 | Peckham | 165—62 |

FOREIGN PATENTS

| 175,404 | 2/1922 | England | 62—238 |

OTHER REFERENCES

Stoecker, W. F.: Refrigeration and Air Conditioning, McGraw-Hill Inc., New York, 1958, pages 182–183.

WILLIAM F. O'DEA, Primary Examiner

P. D. FERGUSON, Assistant Examiner

U.S. Cl. X.R.

62—148, 238, 476; 60—95